(12) United States Patent
Kirschenmann et al.

(10) Patent No.: US 6,374,935 B1
(45) Date of Patent: Apr. 23, 2002

(54) VIBRATION-ISOLATION CAB MOUNTING APPARATUS

(75) Inventors: Kolin J. Kirschenmann, Decatur; Robert L. Mcnabb, Monticello, both of IL (US)

(73) Assignee: Caterpillar S.A.R.L., Geneva (CH)

( * ) Notice: Subject to any disclaimer, the term of this patent is extended or adjusted under 35 U.S.C. 154(b) by 0 days.

(21) Appl. No.: 09/588,957

(22) Filed: Jun. 7, 2000

(51) Int. Cl.[7] ............................................. B62D 33/06
(52) U.S. Cl. ................................. 180/89.12; 180/89.13
(58) Field of Search ........................ 180/89.12, 89.13, 180/89.14; 267/140.5, 141.1, 141, 153; 248/609, 632, 634; 296/190.04, 190.05, 35.1

(56) References Cited

U.S. PATENT DOCUMENTS

| | | | | |
|---|---|---|---|---|
| 2,502,322 A | * | 3/1950 | Iredell, Jr. | 267/140.11 |
| 3,809,427 A | * | 5/1974 | Bennett | 296/35.1 |
| 3,868,190 A | | 2/1975 | Moore | 403/189 |
| 3,990,737 A | * | 11/1976 | Palmer | 296/35.1 |
| 4,061,392 A | | 12/1977 | Lowder et al. | 296/28 |
| 4,186,930 A | * | 2/1980 | Shulke | 277/166 |
| 4,210,362 A | | 7/1980 | Boersma | |
| 4,258,820 A | | 3/1981 | Miura et al. | |
| 4,271,921 A | * | 6/1981 | Ochsner | 180/89.12 |
| 4,391,436 A | * | 7/1983 | Fishbaugh | 267/141.1 |
| 4,429,759 A | * | 2/1984 | Clark | 180/89.14 |
| 4,460,168 A | * | 7/1984 | Obadal | 267/140.1 |
| 4,515,234 A | | 5/1985 | Loy et al. | |
| 4,720,075 A | * | 1/1988 | Peterson et al. | 248/635 |
| 4,783,039 A | * | 11/1988 | Peterson et al. | 248/635 |
| 4,871,150 A | | 10/1989 | Le Salver et al. | |
| 5,110,081 A | | 5/1992 | Lang, Jr. | |
| 5,181,736 A | | 1/1993 | Kokubun | |
| 5,388,884 A | * | 2/1995 | Keehner et al. | 296/190 |
| 5,580,028 A | * | 12/1996 | Tomczak et al. | 248/634 |
| 5,941,920 A | | 8/1999 | Schubert | |
| 5,967,597 A | | 10/1999 | Vande Kooi | 296/109.07 |

FOREIGN PATENT DOCUMENTS

| | | |
|---|---|---|
| GB | 345607 | 3/1931 |
| GB | 1485350 | 9/1977 |
| GB | 2122555 A | 1/1984 |

\* cited by examiner

*Primary Examiner*—Paul N. Dickson
*Assistant Examiner*—Faye M. Fleming
(74) *Attorney, Agent, or Firm*—James R. Smith; John J. Cheek

(57) ABSTRACT

The present invention includes a resilient cab mounting apparatus for resiliently mounting a cab structure, incorporating a roll over protective structure, onto a vehicle frame. The cab mounting apparatus includes a first resilient member which is positioned between the cab structure and the frame members and held in place by use of a mounting structure having an attached upper flange.

11 Claims, 2 Drawing Sheets

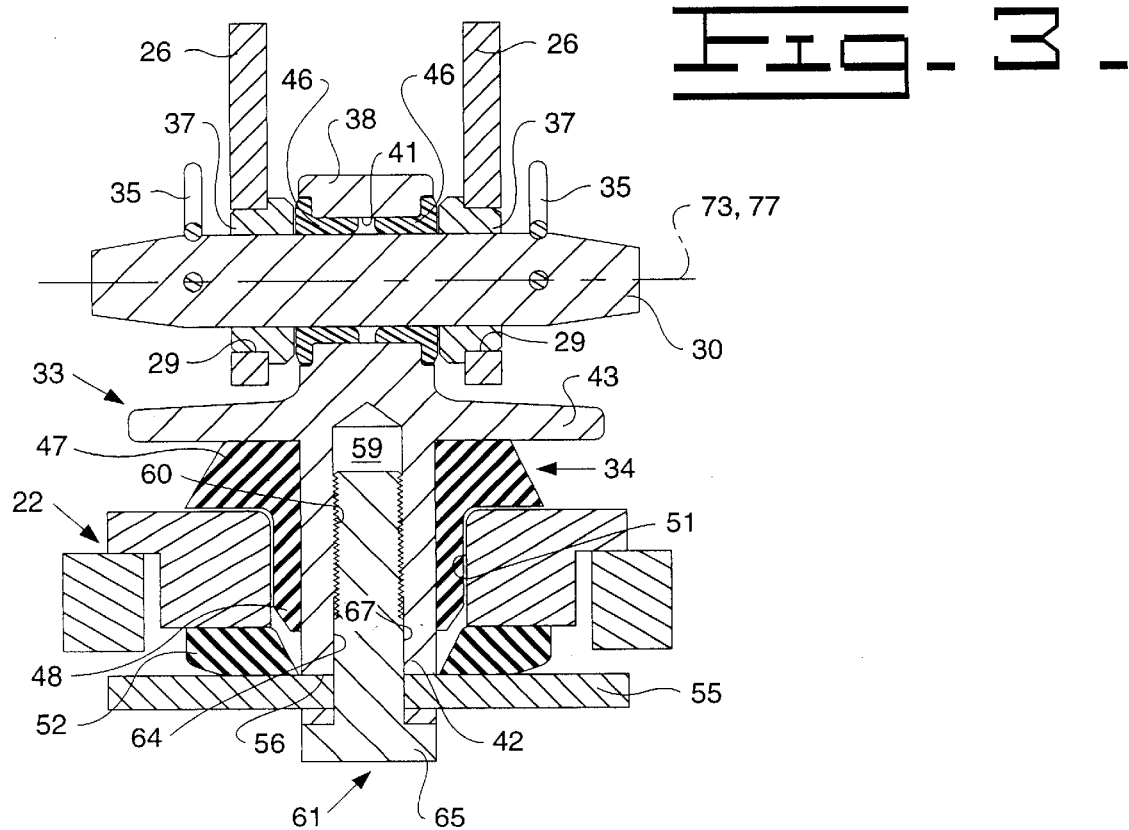
Fig-3-
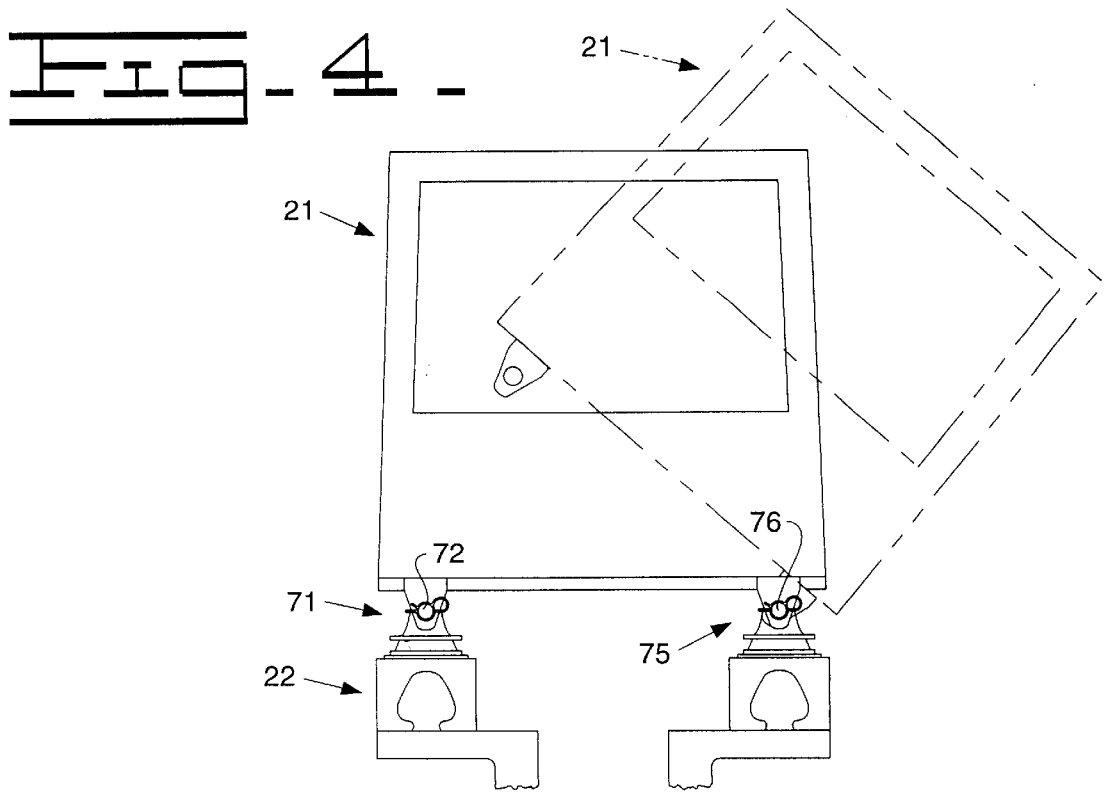
Fig-4-

US 6,374,935 B1

VIBRATION-ISOLATION CAB MOUNTING APPARATUS

TECHNICAL FIELD

This invention relates to a vibration-isolation mounting apparatus and more particularly to a mounting apparatus for mounting a cab structure to the frame of a construction machine.

BACKGROUND ART

Typically, in construction machines it is common for the cab structure to include an operator station and a roll over protection structure (ROPS) in one integrated structure. Since such machines are typically operated across rough terrain, a vibration-isolation type structure is oftentimes used to mount the cab structure the frame members of the construction machine. Such vibration-isolation type structures typically consist of compressed rubber or other elastomeric type materials which are positioned between the cab structure and the frame members and are secured in place by a threaded fastener. Being resiliently mounted as such, the cab structure is permitted to move a preselected amount with respect to the vehicle's frame.

A problem which may arise is that the vehicle's roll over protection structure is intended to remain attached to the frame in the event of vehicle rollover, collision, or other violent event and the vibration-isolation type mounting points may comprise a weak link, particularly if worn or not properly maintained, in the chain of afforded protection do the aforementioned flexible nature of these types of joints and the fact the a large proportion of the generated forces caused by the movement of the cab relative to the frame are borne by aforementioned bolt or bolts. Some typical methods to compensate for bolt failure include adding additional bolted joints, adding one or more shear pins, or providing each bolt with a bolstering-type structure such as rigid sleeves placed concentrically about the bolt. Examples of sleeve-type arrangements can be found in the prior art U.S. Pat. Nos. 5,110,081 and 4,515,234 issued to, respectively, Lang, Jr. and Loy et al., as well as the prior art European Patent No. EP-429-084 issued to Komp et al. While these arrangements may be adequate, the bolt remains the primary load bearing structure for maintaining attachment of the ROPS to the vehicle frame.

DISCLOSURE OF THE INVENTION

In one aspect of the present invention, a mounting apparatus is adopted for mounting a cab structure to a frame member. The mounting apparatus includes first resilient member positioned between the cab structure and the frame member and maintains the cab structure and the frame member in spaced relation to one another. A mounting structure is provided for maintaining the first resilient member between the cab structure and the frame member.

In another aspect of the present invention, a method of rotating a cab structure relative to a frame member is provided. The method includes the first step of providing a first mounting apparatus which includes a resilient member positioned between the cab structure and the frame member, and a mounting structure used for maintaining the resilient member between the cab structure and the frame member. The mounting structure has an aperture in its upper portion that is sized to receive a first pin. The pin, in turn, has a longitudinal first mounting pin axis. The next step consists of rotating the cab structure about the longitudinal first pin axis.

BRIEF DESCRIPTION OF THE DRAWINGS

FIG. 3 is a cross-sectional view, taken from FIG. 2, of the mounting apparatus.

FIG. 4 is a side view showing in alternate detail the rotation of the cab structure using the mounting apparatus of the present invention.

BEST MODE FOR CARRYING OUT THE INVENTION

Figure 1:
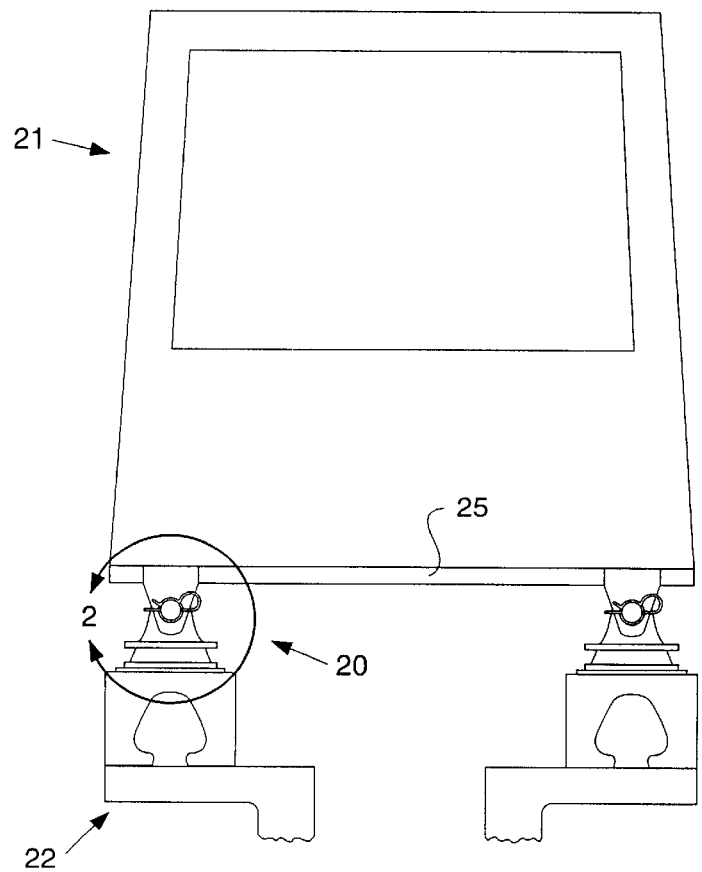
FIG. 1 is a side view of the portion of the cab structure, vehicle frame, and mounting apparatus of an embodiment of the present invention.

With reference now to the Figures, the mounting apparatus of the present invention, generally indicated by reference numeral 20, is shown. The mounting apparatus 20 is positioned between a cab structure 21 and a vehicle frame, typically consisting of frame members all generally indicated herein by reference numeral 22, and isolates these two components from one another. This isolation prevents vibration and noise that occur during the course of operating the vehicle from being transmitted into the cab structure 21.

Figure 2:
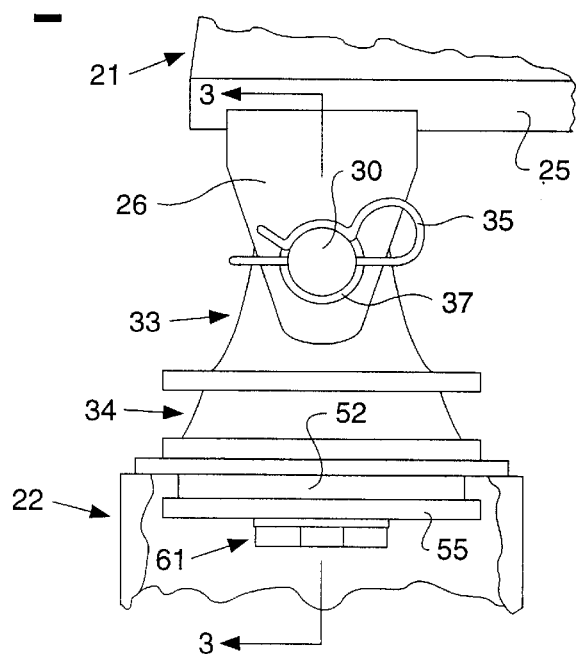
FIG. 2 is an enlarged detail view of the mounting apparatus taken from FIG. 1.

With reference to FIGS. 2 and 3, the cab structure 21 includes a base member 25 that has a plurality of mounting flanges 26 attached thereon. Each respective mounting flange 26, in turn, is provided with an opening 29 sized to receive a mounting pin 30 which is used to couple the mounting structure 33 of the present invention to the cab structure 21. Although further details of the mounting structure 33 will be discussed as this disclosure progresses, suffice to say for now, the mounting structure 33 preferably comprises a single cast or forged component and is used, for example, to absorb and withstand the forces associated with the movement of the cab structure 21 relative to the frame members 22 and maintain the first resilient member 34 between the cab structure 21 and the frame members 22. Clips 35 may be attached, in well-known ways, to the mounting pin 30 to maintain the mounting pin 30 in place. To facilitate relative movement between the cab structure 21 and the mounting pin 30, each respective opening 29 may be provided with a bushing 37.

The mounting structure 33 comprises an upper portion 38 having an aperture 41 sized to receive the mounting pin 30, and a substantially-cylindrical force absorbing portion 42 extending downwardly from a preferably integral upper flange portion 43. As will be appreciated by those of ordinary skill in such art, the provision of the mounting pin 30 for coupling the mounting structure 33 with the cab structure 21 allows for pivotal movement of the cab structure 21 relative to the frame members 22 thereby allowing for relatively quick and easy access to vehicle components (not shown) under the cab structure 21. To further reduce transmission of noise and vibration form the frame members 22 to the cab portion 21, a vibration absorbing material 46, preferably at least one non-metallic bushing, may be placed between the mounting pin 30 and the aperture 41.

Positioned substantially between the cab structure 21 and the frame members 22 is the first resilient member 34 preferably comprising a rubber or other elastomeric-type material. As shown, the first resilient member 34 is preferably defined by an enlarged portion 47 and a reduced portion 48 with the enlarged portion 47 arranged for concentric placement about the force absorbing portion 42 substantially between the frame member 22 and the upper flange portion 43, and the reduced portion 48 arranged for concentric placement within the frame member bore 51 adjacent the force absorbing portion 42. As should be apparent to those of ordinary skill in such art, by using the first resilient member 34 to maintain the cab structure 21 and the frame members 22 in a spaced relation to one another, the cab structure 21 may be more effectively isolated from noise and vibration transmitted through the frame members 22. Likewise, a second resilient member 52, also made of a preferably rubber or other elastomeric-type material, is structured and arranged for concentric placement about the force absorbing portion 42 substantially between the frame members 22 and the base portion 55.

As will be appreciated by those skilled in such art, to ensure that the cab structure 21 remains attached to the vehicle frame 22 in the event of a rollover event, the base portion 55 is selected to yield, upon receiving a predetermined load, prior to bending or breaking of the fastener 61. Depending upon such factors as, for example, the material selection for the fastener 61, size of fastener 61, expected forces and loadings, and weight of the cab structure 21, a base portion 55 of a suitable geometry, material type, and yield strength may be selected.

The base portion 55, preferably comprising a metallic material, is preferably attached adjacent the bottom surface 56 of the force absorbing portion 42. To facilitate such attachment, the bottom surface 56 is provided with an internal bore 59 having a threaded portion 60 and a non-threaded portion 64, both sized to receive a mechanical fastener 61. When attached to the bottom surface 56, the base portion 55 lies substantially between the head portion 65 of fastener 61 and the second resilient member 52. In order to effectively provide the union of the fastener 61 and force absorbing portion 42 with load bearing characteristics approximating that of a single load bearing structure, it is preferred that the shoulder portion 67 of fastener 61 have a diameter substantially equal to, but preferably not greater than, the diameter of the non-threaded portion 64.

With reference now to FIG. 4, a preferred method for rotating a cab structure 21 relative to a vehicle's frame members 22 will now be discussed. Shown is a first mounting apparatus 71 used to attach the cab structure 21 with the frame members 22 at a one location. In the same aforementioned manner, the cab structure 21 is attached to the first mounting apparatus 71 by use of a first mounting pin 72 having a longitudinal first mounting pin axis 73 (shown best in FIG. 3). A second mounting apparatus 75 is shown securing the cab structure 21 to the frame members 22 at a second location. The second mounting apparatus 75 also includes a second mounting pin 76 which has a longitudinal second pin axis 77 (shown best in FIG. 3) that is not co-linear with the longitudinal first mounting pin axis 73. Rotating the cab structure 21 relative to the frame members 22 consists of removing one of the first or second pins 72, 76 and rotating the cab structure 21 about the longitudinal mounting pin axis 73 or 77 of the remaining first or second pin 72, 76, thereby allowing access to those components located beneath the cab structure 21 without the need to completely separate the cab structure 21 from the frame members 22.

INDUSTRIAL APPLICABILITY

With the mounting apparatus 20 as set forth above, it can be seen that the cab structure 21 is substantially isolated from the vehicle frame members 22 by the first and second resilient members 34,52. Being so mounted, the transmission of noise and vibration that would otherwise be a source of discomfort to the operator housed within the cab structure 21 is greatly reduced.

The provision of a single piece mounting structure 33 having an integral upper flange portion 43 allows for the fastener 61 to have a shorter length thereby allowing the most of the resulting forces and bending moments acting upon the mounting apparatus 20 to be borne by the force absorbing portion 42. In addition, by minimizing the clearance between the shoulder portion 67 and the non-threaded portion 64 of the internal bore 59, many of the resultant forces acting upon the fastener 61 may be transferred to the diametrically larger force absorbing portion 42. Additionally, by providing the upper portion 38 of the mounting structure 33 with an aperture 41 sized to receive a mounting pin 30, pivotal movement of the cab member 21 relative to the vehicle's frame members 22 is provided.

In the event of vehicle rollover, the base portion 55 is selected to yield before fastener 61 failure upon the application of a pre-determined amount of stress. As will be appreciated by those of ordinary skill in such art, by selecting a base portion 55 to yield when the stress exceeds the predetermined amount ensures that the fastener 61 will remain attached to the force absorbing portion 42, thereby preventing the cab structure 21 from separating from the vehicle frame members 22. Other aspects, objects and advantages of this invention can be obtained from a study of the drawings, the disclosure and the appended claims.

What is claimed is:

1. A mounting apparatus adapted for mounting a cab structure to a vehicle frame, comprising:

a cab structure;

a vehicle frame;

a first resilient member positioned between the cab structure and the vehicle frame and adapted for maintaining the cab structure to the vehicle frame in spaced relation to one another;

a mounting structure adapted for maintaining said first resilient member between the cab structure and the vehicle frame, said mounting structure comprises a force absorbing portion having an internal bore, said internal bore having a non-threaded portion;

a fastener adapted for engaging said internal bore portion, said fastener having a head portion and a shoulder portion having a shoulder portion diameter substantially equal to the diameter of a non-threaded portion of said internal bore;

an upper flange attached to said mounting structure;

a base portion attached to said force absorbing portion;

a second resilient member positioned between the vehicle frame and said base portion; and said mounting structure is pivotally attached with said cab structure.

2. The mounting apparatus of claim 1 wherein:

said mounting structure further comprises a upper portion having an aperture structured and arranged to receive a mounting pin.

3. The mounting apparatus of claim 2 further comprising a vibration absorbing material disposed between said aperture and said mounting pin.

4. A method of providing a resiliently mounted cab structure rotatable relative to a frame member, comprising the steps of:

securing an upper portion of a first mounting structure with a cab structure by a first pivot pin;

coupling said first mounting structure with the frame portion;

positioning a resilient member concentrically about said first mounting structure substantially between the cab structure and the frame member; and rotating the cab structure about a longitudinal first mounting pin axis.

5. The method of claim 4 further comprising the steps of:

securing an upper portion of a second mounting structure with a cab structure by a second pivot pin having a second mounting pin axis not co-linear with said longitudinal first mounting pin axis;

coupling said second mounting structure with the frame portion;

positioning a resilient member concentrically about said second mounting structure substantially between the cab structure and the frame member;

removing one of said first or second mounting pins; and rotating the cab structure about said longitudinal mounting pin axis of the remaining first or second mounting pin.

6. A mounting arrangement for mounting an operator station to a machine frame, comprising:

a frame structure having an aperture formed therein, said frame structure having first and second opposed surfaces;

a mounting member having an integral flange spaced from and confronting said first frame structure surface, said mounting member having an integral post depending therefrom and extending through the aperture in said frame structure, said integral post having a bore formed in a free end thereof;

a first dampening member trapped between said flange and said first frame structure surface;

a retaining member disposed adjacent said second frame structure surface and having a surface spaced from and confronting said second frame structure surface, said retaining member being secured to said post by a fastener that is releasably received in said bore; and a second dampening member trapped between said retaining member and said second frame structure surface.

7. The mounting arrangement of claim 6 wherein said mounting member further includes an operator station frame structure pivotally connected with said mounting member.

8. The mounting arrangement of claim 6 wherein said bore in said integral post has a threaded portion and an unthreaded portion, and wherein said fastener has a threaded portion and an unthreaded portion, said respective threaded portions cooperating to secure said fastener to said mounting member, the unthreaded portion of said bore having a predetermined diameter and the unthreaded portion of said fastener having a diameter substantially equal to the diameter of said unthreaded portion of said bore.

9. The mounting arrangement of claim 6 wherein said first dampening member includes a portion extending into the aperture in said frame structure and surrounding at least a portion of the post of said mounting member.

10. A method for mounting an operator station to a machine frame, said machine frame including a frame structure having an aperture formed therein, said frame structure having first and second opposed surfaces, said method comprising:

providing a mounting member having an integral flange and an integral post depending therefrom having a bore formed in a free end thereof;

positioning the mounting member so that the integral post of said mounting member extends through the aperture in said frame structure such that the mounting member flange is spaced from and confronting said first frame structure surface to thereby trap a first dampening member between said mounting member flange and said first frame structure surface;

positioning a retaining member adjacent said first frame structure surface; surface, said retaining member having a surface spaced from and confronting said second frame structure surface; and securing said retaining member to said post by a fastener that is releasably received in said bore to thereby trap a second dampening member between said retaining member and said second frame structure surface.

11. The method of claim 10 wherein said bore in said integral post has a threaded portion and an unthreaded portion, and wherein said fastener has a threaded portion and an unthreaded portion, said respective threaded portions cooperating to secure said fastener to said mounting member, the unthreaded portion of said bore having a predetermined diameter and the unthreaded portion of said fastener having a diameter substantially equal to the diameter of said unthreaded portion of said bore.

* * * * *

UNITED STATES PATENT AND TRADEMARK OFFICE
CERTIFICATE OF CORRECTION

| | | |
|---|---|---|
| PATENT NO. | : 6,374,935 B1 | Page 1 of 1 |
| DATED | : April 23, 2002 | |
| INVENTOR(S) | : Kolin J. Kirschenmann et al. | |

It is certified that error appears in the above-identified patent and that said Letters Patent is hereby corrected as shown below:

<u>Title page,</u>
Please correct the name of an inventor as follows:
"Robert L. Mcnabb" should be changed to -- Robert L. McNabb --

<u>Column 6,</u>
Line 28, delete "first" and insert -- second --
Line 29, delete "surface;"

Signed and Sealed this

Eighth Day of October, 2002

Attest:

Attesting Officer

JAMES E. ROGAN
*Director of the United States Patent and Trademark Office*